United States Patent
Bissell

[15] 3,641,820
[45] Feb. 15, 1972

[54] BOURDON TUBE HAVING INTEGRAL POINTER
[72] Inventor: Robert D. Bissell, Orange, Conn.
[73] Assignee: Dresser Industries, Inc., Dallas, Tex.
[22] Filed: Mar. 9, 1970
[21] Appl. No.: 17,681

[52] U.S. Cl....................................73/418, 29/422, 29/475
[51] Int. Cl........................................G01l 7/04, B23p 17/00
[58] Field of Search............73/418, 369; 72/369; 113/54 A; 29/475 R, 422

[56] References Cited

UNITED STATES PATENTS

| | | | |
|---|---|---|---|
| 3,222,933 | 12/1965 | Howard | 73/418 |
| 2,803,695 | 8/1957 | Woolley, Jr. | 29/422 |
| 2,224,841 | 12/1940 | Berry | 113/54 A X |
| 3,277,722 | 10/1966 | Huston | 73/418 |
| 2,465,872 | 3/1949 | Heath | 72/369 X |

Primary Examiner—S. Clement Swisher
Assistant Examiner—Daniel M. Yasich
Attorney—Robert W. Mayer, Thomas P. Hubbard, Jr., Daniel Rubin, Raymond T. Majesko, Roy L. VanWinkle, William E. Johnson, Jr. and Eddie E. Scott

[57] ABSTRACT

A Bourdon tube in which the integral free end is constructed to simulate a pointer. When employed in a pressure gauge, the free-pointered end is moveable relative to a calibrated dial plate for indicating the values of pressure being sensed.

8 Claims, 9 Drawing Figures

PATENTED FEB 15 1972
3,641,820
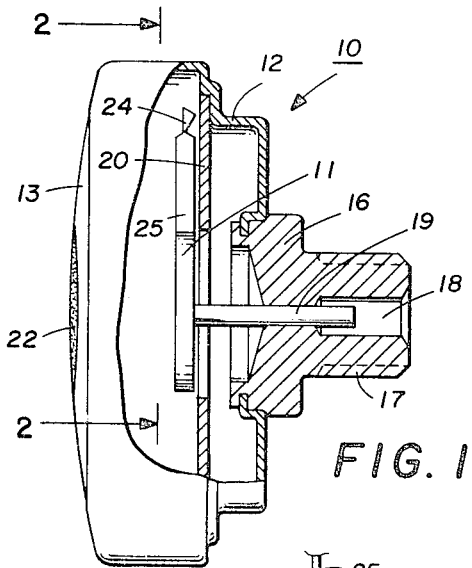
FIG. 1
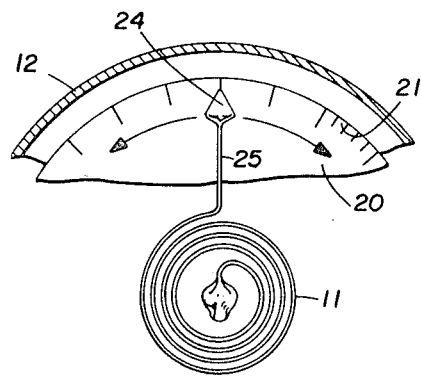
FIG. 2
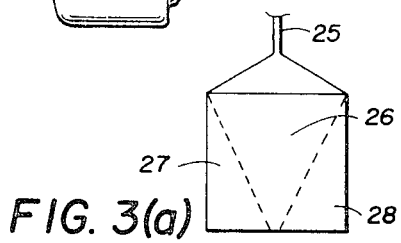
FIG. 3(a)
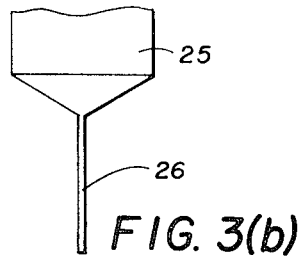
FIG. 3(b)
FIG. 3(c)
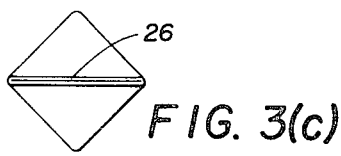
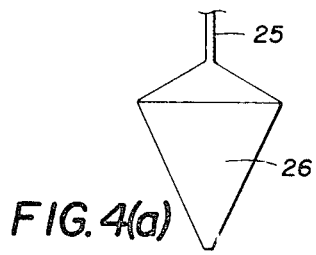
FIG. 4(a)
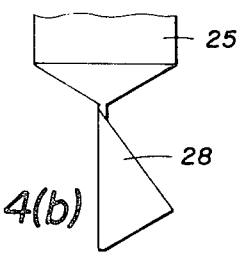
FIG. 4(b)
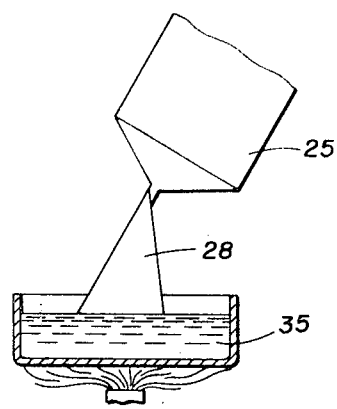
FIG. 5
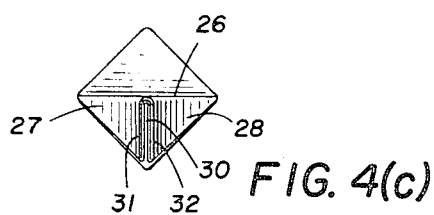
FIG. 4(c)
INVENTOR
ROBERT D. BISSELL
*Daniel Rubin*
ATTORNEY

BOURDON TUBE HAVING INTEGRAL POINTER

CROSS-REFERENCE TO RELATED APPLICATIONS

None

BACKGROUND OF THE INVENTION

1. The field of art to which the invention pertains includes the art of measurement and testing as more specifically directed to pressure gauges and their construction.

2. Pressure gauges enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product. Dictating a minimum standard of quality is the need for prior marketing approval by the Underwriters Laboratory requiring that the gauge have a burst pressure rating at least five times the gauge rating.

Inherent in conventional-type pressure gauges is the Bourdon tube of a pressuretight construction having a free end displaceably moveable in response to pressure changes. To translate tube movement into readout pressure values it is customary to attach or otherwise connect a pointer to the free end and which then moves relative to a calibrated dial plate.

In relatively small pressure gauges on the order of one inch and less, the Bourdon tube is usually constructed as generally flat in cross section multiconvolution spiral to obtain the necessary operating lineage in a minimum of consumed space. Specifically, such a Bourdon tube when used with a nominal 1-inch gauge of actual 1 5/16 diameter will be approximately 7/16 inches in diameter of tubing generally flattened to about 1/8 inches wide and 1/64 inches in depth. When of these small sizes, attaching a pointer to the free tube end has been most difficult frequently incurring an assembly cost disproportionate to the overall cost of the instrument. In recognition of this problem one approach has been to attach a U-shaped member over the coil end and the two are then soldered together to produce the required pressuretight joint thereat. While such a construction has worked well where sufficiently large components are involved, it has been extremely difficult heretofore to effect a pressuretight solder joint meeting U. L. specifications with Bourdon tube constructions of dimensions on the order given above. Likewise, attempts to previously produce integral pointer constructions have proved unsuccessful because of an inability to assuredly produce the required pressuretight closing of the tube end thereat.

SUMMARY OF THE INVENTION

The invention relates to the method of forming a simulated pointer integrally constructed at the free end of a Bourdon tube and the product thereof. More specifically, the invention relates to Bourdon tube construction in which attachments or connections of a separate pointer member to provide readout indications as in the prior art is eliminated. By forming a pointer in accordance herewith, difficulties associated with pointer construction in the prior art are overcome while at the same time assuredly and reliably producing the required pressuretight tube closing thereat on a high volume, production basis.

It is therefore an object of the invention to provide a novel method for forming a pointer at the free end of a Bourdon tube.

It is a further object of the invention to provide a method as in the previously recited object which lends itself to production manufacture of small size tube coils to overcome the difficulties associated with prior art construction.

It is a further object of the invention to provide a method of Bourdon tube pointer construction affording substantial costs savings over methods previously employed and without sacrifice in the reliability or effectiveness of the other active tube properties.

It is a still further object of the invention to provide a Bourdon tube pointer construction produced by the methods of the aforementioned objects.

BRIEF DESCRIPTION OF THE DRAWINGS

FIG. 1 is side elevation partially in section of a typical pressure gauge constructed with a Bourdon tube in accordance herewith;

FIG. 2 is a front view of the Bourdon tube in accordance herewith as represented by a section taken substantially along the lines 2—2 of FIG. 1;

FIG. 3 (a), (b), (c) are plan, side, and end views respectively of the first step in pointer formation;

FIG. 4 (a), (b), (c) are the plan, side, and end views respectively of the second step in pointer formation; and FIG. 5 diagrammatically illustrates the final step in pointer formation.

With reference to FIGS. 1 and 2 there is shown a pressure gauge designated 10 of a conventional type including a Bourdon tube 11 constructed in accordance herewith. The gauge typically consists of a case 12 closed at its front by a transparent crystal 13 and at the rear contains a socket member 16 having a threaded end 17 for mounting the gauge in a suitably provided connector. Centrally within the socket is an open bore 18 in which the fixed open end 19 of the Bourdon tube is secured. As can be seen, the Bourdon coil is of a spiral multiconvolution construction axially supported slightly forward of a dial plate 20 having pressure scale graduations 21 within the operating range of the instrument. By this arrangement, a simulated pointer 24 at the free end of tube 11 will move relative to the dial graduations for indicating pressure variations to which the Bourdon tube is caused to respond. A centrally circular opaque area 22 can be provided on crystal 13 when desired so as to conceal the Bourdon coil directly behind.

Formation of the pointer in accordance herewith will now be described with reference to FIGS. 3–5. As can be appreciated, the steps of pointer formation can either precede or succeed forming the active portion of the Bourdon tube. Preferably the pointer is formed simultaneously with tube flattening prior to coiling. In either event forming the pointer is begun with a short radial end section designated 25 ultimately bent outward approximately 90° to the plane of the last spiral convolution. Following the latter, a tipmost or terminal end section 26 is bent flat to a plane centrally located and extending transverse with respect to the remaining integrally connected portion of section 25. Thereafter each of the corners 27 and 28, as defined by the dashed lines in FIG. 3 (a), are folded or bent downward from a center location at the terminal edge. Bending is continued until reaching the relationship of FIG. 4 in which the folds terminate at a spacing 30 between them defined by opposite parallel and juxtaposed corner ends 31 and 32. The pointer configuration thus formed is then metallurgically sealed by being momentarily dipped into a pot of molten solder 35 (FIG. 5) to close off all openings against pressure leakage. At the same time the solder provides a bond between ends 31 and 32 of sufficient mechanical strength to resist distortion from subsequently imposed internal pressures. The last soldering step completes the integral pointer formation and by view of the simplicity of procedures it can be appreciated that the entire integral pointer construction can be completed on a production basis in approximately six seconds.

By the above description there is disclosed a novel Bourdon tube construction having a simulated pointer formed integrally part of the moveable end. The tube when so constructed has a burst pressure rating exceeding U. L. specifications and is mounted into a conventional-type pressure gauge wherein the pointer is situated to be displaced opposite a calibrated dial indicating pressure values received within the tube. The method of construction can be achieved at minimum cost and when the end product is viewed through the crystal the simulated pointer appears as a conventional type pointer as in the prior art. At the same time the former problems associated with attaching or connecting pointers of the prior art are overcome in a manner contributing substantially to a manufacturing cost reduction of particularly small gauge diameters. Such a result has not been previously known despite the simplicity inherent in the method by which the pointer construction hereof is obtained.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A method of forming an integral simulated pointer at the moveable end of a Bourdon tube, comprising the steps of:
   a. bending a terminal end section of a Bourdon tube to a substantially flattened plane extending generally transverse to the integrally connecting portion of said tube;
   b. folding the corners of said flattened section from a central location at the terminal edge thereof until the corners are spaced apart juxtaposed and substantially parallel to each other; and
   c. connecting said juxtaposed corner edges into a pressure-resistant joint thereat.

2. A method according to claim 1 in which the step of connecting said corner edges comprises applying a solder bond thereat.

3. A method according to claim 1 in which said bending step comprises effecting opposed bidirectional bending forming a flattened plane generally centrally located with respect to the connecting integral portion of said tube.

4. A method according to claim 1 in which the said step of connecting said corner edges comprises applying a metallurgical bond thereat.

5. In a Bourdon tube including an open end in which to receive pressure to be sensed and an opposite end moveable in response to pressure changes received at said open end, the improvement comprising:
   a simulated pointer at the terminal portion of said moveable end comprising an integral part of said moveable end bent to simulate a pointer when viewed in a direction generally toward the coiled axis of said tube, said simulated pointer including:
   a. a substantially flat face surface extending generally transverse to the plane of the integrally connected tube portion thereat;
   b. the apexmost end of said simulated pointer being represented by oppositely bent corners originating from the terminal edge of said pointer face surface; and
   c. said bent corners terminating spaced apart extending juxtaposed generally parallel to each other and secured in a pressure-resistant joint.

6. In a Bourdon tube according to claim 5 further including the combination of a dial plate and a casing cooperating with said Bourdon tube to form an indicating pressure gauge.

7. In the improvement according to claim 5 in which said pressure-resistant joint comprises a metallurgical bond.

8. In the improvement according to claim 7 in said pressure-resistant joint comprises a solder connection.

* * * * *